US007797136B2

(12) United States Patent
Klein et al.

(10) Patent No.: US 7,797,136 B2
(45) Date of Patent: Sep. 14, 2010

(54) METRICS TO EVALUATE PROCESS OBJECTS

(75) Inventors: Udo Klein, Maximiliansau (DE); Thomas Gerhard Wieczorek, Meckesheim (DE); Daniel Zimmermann, Leimen (DE); Oliver Sievi, Sandhausen (DE); Guenter Pecht-Seibert, Muehlhausen (DE)

(73) Assignee: SAP AG, Walldorf (DE)

( * ) Notice: Subject to any disclaimer, the term of this patent is extended or adjusted under 35 U.S.C. 154(b) by 855 days.

(21) Appl. No.: 11/613,421

(22) Filed: Dec. 20, 2006

(65) Prior Publication Data

US 2008/0155503 A1    Jun. 26, 2008

(51) Int. Cl.
*G01M 19/00* (2006.01)
*G06F 11/34* (2006.01)
(52) U.S. Cl. .......................... 702/186; 702/123; 705/11
(58) Field of Classification Search ................ 702/108, 702/123, 186; 717/124–126, 135; 705/11
See application file for complete search history.

(56) References Cited

U.S. PATENT DOCUMENTS

| 6,301,701 | B1* | 10/2001 | Walker et al. | 717/125 |
| 6,763,353 | B2* | 7/2004 | Li et al. | 707/4 |
| 2002/0116362 | A1* | 8/2002 | Li et al. | 707/1 |
| 2004/0186764 | A1* | 9/2004 | McNeill | 705/10 |

* cited by examiner

*Primary Examiner*—Manuel L Barbee
(74) *Attorney, Agent, or Firm*—Kenyon & Kenyon LLP

(57) ABSTRACT

A method and system to evaluate process objects for acceptability for use. New metrics that measure both object components and their relationships are used. The method selects metrics for the process objects that measure both the components and their relationships, compares measurements of the selected metrics with corresponding metric norms, and, based on the comparison, determines whether the process objects are acceptable. The system includes a memory to store metrics and process objects and a processor to select applicable metrics for the process objects, calculate the measurements of the selected metrics, compare the measurements to corresponding metric norms, and, based on the comparison, determine whether the process objects are acceptable.

20 Claims, 5 Drawing Sheets

EXAMPLE

| Metric | Metric Inputs | Input Sources | Measurement (units) | Norm |
|---|---|---|---|---|
| Object Design Quality – Functional Correctness | Testing results, e.g., % code tested, number error messages, number of simulation failures | Test tool | Correctness (%) | High correctness |
| Object Design Quality – Comprehensibility | Clarity of design documentation, number of questionable components, design terminology match ordinary meaning | Questionnaire | Comprehensibility (%) | Highly comprehensible |
| Object Design Quality – Flexibility | Number of associations, ease of change | Design tool, questionnaire | Degree of flexibility (1-100) | Highly flexible |
| Object Design Quality – Structural Complexity | Number of associations, depth, width, number of components | Design tool | Complexity level (1-10) | Low complexity |
| Object Design Quality – Model Completeness | Number of fault messages | Test tool | Completeness (%) | High completeness |
| Object Design Quality – Implementation Complexity | Variation from design, number of configuration variants, number of objects | Test tool | Complexity level (1-10) | Low complexity |
| Object Design Quality – Separation of Concerns | Accessibility to and modification of same components by different components, amount of separation made design | Test tool, design tool | Separable (low, med, high) | High separation |
| Object Design Quality – Suitability for User Interface Consumer | Number of UI screens, accessibility of entire object through UI to consumer | Consumer feedback, test tool | Suitability (low, med, high) | High suitability |
| Object Design Quality – Business Readiness | Number of changes to design, reasons for changes, design terminology match ordinary meaning, number of functional requirements | Design tool, questionnaire | Readiness (0-no, 1-yes) | Ready to deploy |
| Critical Constructs | Number of associations, number of synchronous method calls | Test tool, design tool | Criticality (optimization output) | Optimum based on efficiency and complexity |
| Process Efficiency | Number of design documents and people involved, number of action items during design | Questionnaire, designer feedback | Efficiency (low, med, high) | Highly efficient |
| Graph Theoretical Analysis | Nodes in graph clusters compared to components in design objects | Graph tool | Analysis (number of anomalies) | No anomalies |
| Architecture Fit | Number of objects, number of nodes, amount of adaptation needed for customer | Designer feedback, design tool | Match (1-100) | Close match of actual to design |

FIG. 4

METRICS TO EVALUATE PROCESS OBJECTS

BACKGROUND

A process object is an object in a computer system that describes the structure and behavior of a business process. As such, the process object may include data, logic, and structures. The process object may have data and routines to manipulate the data, as in object-oriented objects, and structures, e.g., database tables, to describe the relationships (or associations) with other process objects, as in relational database objects. In a system, these process objects are generally the core structuring components to encapsulate the functionalities that applications need to implement business processes. Each process object advantageously provides a discrete representation of the structure and behavior of a business process. An application to implement a business process may then advantageously access the appropriate process objects and their data, without having to know the details of the underlying implementation.

Unlike traditional objects, this process object encapsulates the business process' functionality within the object itself (and, in some cases, in other entities referenced by the object), defines relationships between different components and process objects, and provides the basic building block for applications. Whereas the traditional object defines, rather than encapsulates, functionality at a high level by referring to the business modules that provided the functionality. Here, the business modules are the basic building blocks for applications. The traditional object also does not include structural information about the object's relationships. In many cases, the process object has superseded the traditional object in a system.

Since process objects are generally the core structuring components in a system, the process objects should be designed to operate properly for use in the system in order to avoid propagating errors throughout the system. Therefore, it is important to qualitatively and quantitatively evaluate the process objects to ensure they are acceptable for use in the system.

However, known object-oriented evaluation tools are not effective because they provide metrics to measure certain object-oriented aspects of the objects, but not to measure object relationships. Similarly, known relational database evaluation tools are not effective because they provide metrics to measure certain relational aspects of the objects, but not to measure object data and routines. Neither is there any reasonable way to combine these disparate evaluation tools.

Accordingly, there is a need in the art for an effective way to evaluate the data, routines, and relationships of these process objects to determine their acceptability for use.

BRIEF DESCRIPTION OF THE DRAWINGS

FIG. 4 is a chart of example metrics that may be used to evaluate the acceptability of process objects in accordance with an embodiment of the present invention.

DETAILED DESCRIPTION

Embodiments of the present invention include a method, a system, and an apparatus to evaluate process objects for acceptability of use in a computer system. Evaluation is made based on new metrics that are well-suited for process objects. The metrics measure both process object components and their relationships. Accordingly, the metrics advantageously provide relevant measurements for an effective evaluation of the acceptability of use of the process objects.

In a method according to an embodiment of the present invention, a processor may select one or more metric from among a group of determined metrics to evaluate process object data, routines, and relationships. If measurements of the selected metrics indicate that the process object is acceptable, the process object is considered ready for use in applications.

A system in accordance with an embodiment of the present invention may include a memory to store metrics and process objects and a processor to evaluate process objects. The processor may determine one or more metric from a group of metrics that evaluate process object data, routines, and relationships. The processor may select the determined metrics to evaluate a process object. The processor may then evaluate measurements of the selected metric to determine whether the process object is acceptable for use in applications.

An apparatus in accordance with an embodiment of the present invention may include a metric selector, one or more metric measurement generators, one or more comparators, and an evaluator. The metric selector may select the metrics to measure for the process objects. The measurement generators may generate the measurements of the selected metrics. The comparator may compare the generated measurements to their corresponding metric norms. The evaluator may evaluate whether the process objects are acceptable based on the comparator results.

Figure 1:
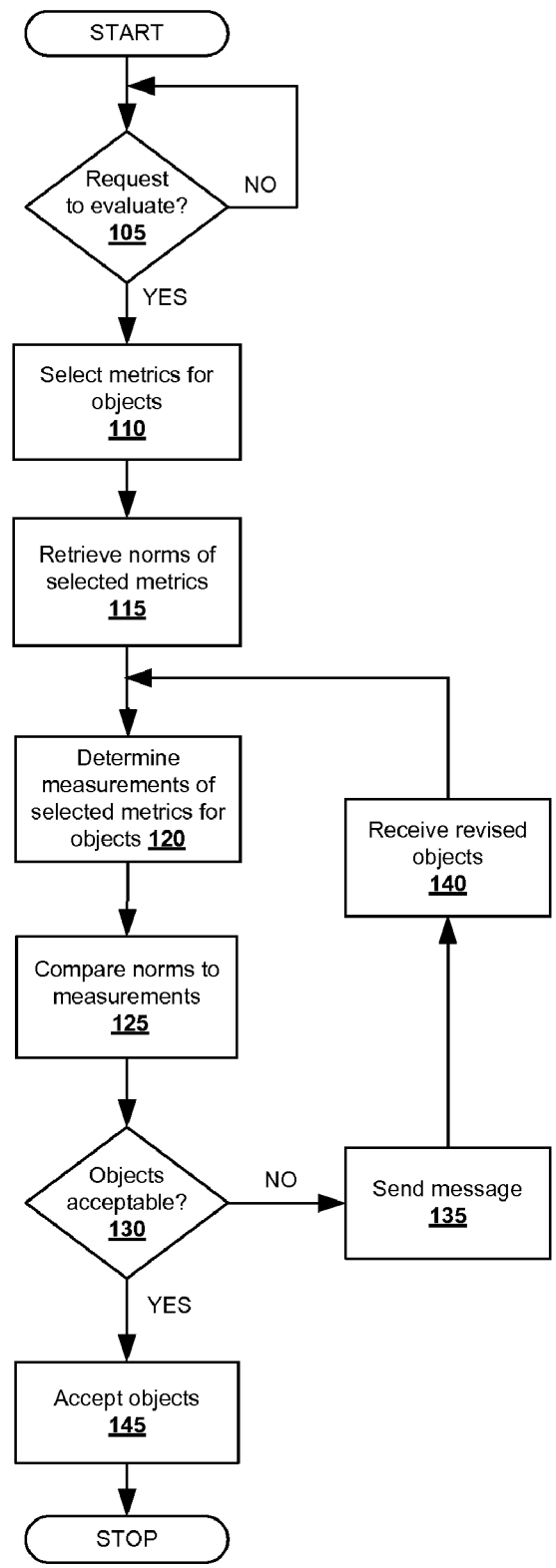
FIG. 1 is a flowchart of a method to evaluate the acceptability of process objects in accordance with an embodiment of the present invention.

FIG. 1 is a flowchart of a method to evaluate the acceptability for use of process objects in accordance with an embodiment of the present invention. A processor may await (105) a request from a user or another processor to evaluate one or more process objects. The process objects to be evaluated may be newly added objects, revised existing objects, and/or unrevised existing objects.

The processor may select (110) metrics for the process objects to determine whether the process objects are acceptable to use. The metrics may measure information about the data, the routines, and the relationships that make up the process objects. And the processor may select those metrics that would be the best indicators of the process objects' acceptability.

Metric selection may be made in any number of ways. For example, the processor may receive selections from the user. Or the processor may identify or calculate certain properties of or information about the process objects and then select the metrics based on the identification or calculation, e.g., from a look-up table in which metrics are categorized based on the type of process object and/or identified properties of the process object. Any other way may be used that is capable of selecting the appropriate metrics to use to determine acceptability of use of process objects in accordance with an embodiment of the present invention. An embodiment of a metric selection method will be described below with regard to FIG. 2.

Examples of metrics that may be used will be described below with regard to FIG. 4.

According to FIG. 1, the processor may retrieve (115) predefined metric norms from memory that correspond to the selected metrics. A norm of a metric is a measurement that is considered to be "normal" and therefore acceptable for use. The norm may be defined based on metric measurements that, through observation or analysis, have been attributable to acceptable process objects.

The processor may determine (120) the measurements of the selected metrics for the process objects. To do so, the processor may receive information about the data, routines, and relationships of the process objects from the user or another processor. The type of information to be received may be predetermined to be associated with a particular metric. Accordingly, for a selected metric, the processor may look, in the look-up table, e.g., as described above, the type of information to receive. The processor may then receive value of the looked-up information by calculating the value and/or extracting the value from memory. From the received values of the information, the processor may determine the metric measurements by mathematical calculation, character analysis, logical reasoning, etc., where the results of the determination may be a number, character, symbol, logic, etc.

The processor may compare (125) the retrieved norms with the determined measurements of the selected metrics. For example, for numerical measurements, the processor may calculate the differences between the measurements and the corresponding norms.

The processor may evaluate (130) the comparison results to determine whether the process objects are acceptable. The closer the metric measurements are to the norms, the more likely the process objects are to be acceptable. For numerical measurements, the processor may determine whether the calculated differences are approximate to a predetermined value, within a predetermined range, or less than or greater than a predetermined limit. Each metric may have a predetermined value, range, and/or limit against which its comparison result is checked to determine whether the result indicates acceptability.

If only one metric is selected for a process object, then the processor may determine acceptability based on that metric. If, however, several metrics are selected for a process object, then the processor may determine the acceptability based on whether at least a predetermined number of the selected metrics indicate acceptability. Alternatively, the processor may combine the comparison results of all the selected metrics and determine the acceptability based on whether the combined result exceeds a predetermined threshold. Other such techniques may be used to determine acceptability when there are several metrics per process object.

If the process objects are determined to be acceptable (130), the processor may accept (145) the process objects to be used in applications.

If, however, the process objects are determined to be unacceptable (130), the processor may send (135) a message to a user that there are unacceptable objects. The message may indicate which objects are unacceptable, which metrics indicate the unacceptability, and/or which acceptable objects may be affected by the unacceptable objects. The user may revise the unacceptable process objects to correct any data, routines, and/or relationships therein that led to the unacceptability. The processor may then receive (140) the revised process objects and repeat the determining (120), comparing (125), and evaluating (130) until all the process objects are acceptable.

In some cases, the user may wish to override the processor's unacceptability determination and accept a process object even though it deviates from the norm. To do so, upon receipt of a message from the processor that there are unacceptable objects, the user may input an override command for one or more of the unacceptable objects. The processor may then accept (145) the "overridden" process objects to be used in applications. If there are any remaining unacceptable objects that the user did not override, the user may revise these remaining unacceptable objects. The processor may then receive (140) the revised process objects and repeat the determining (120), comparing (125), and evaluating (130) for the process objects.

In this embodiment, all the process objects may be deemed unacceptable if at least one of them is unacceptable. As such, all the process objects may be re-evaluated after the unacceptable process objects are revised to ensure that the revised process objects do not adversely affect related objects. In an alternate embodiment, other re-evaluation options may be available. For example, if the unacceptability for a process object is based on information about that process object alone, e.g., data within that object, routines that are not referenced by other objects, or intra-relationships, then the processor may optionally re-evaluate that process object only. Similarly, if the unacceptability is related to only a subset of process objects, then the processor may optionally re-evaluate only that subset of affected process objects.

Figure 2:
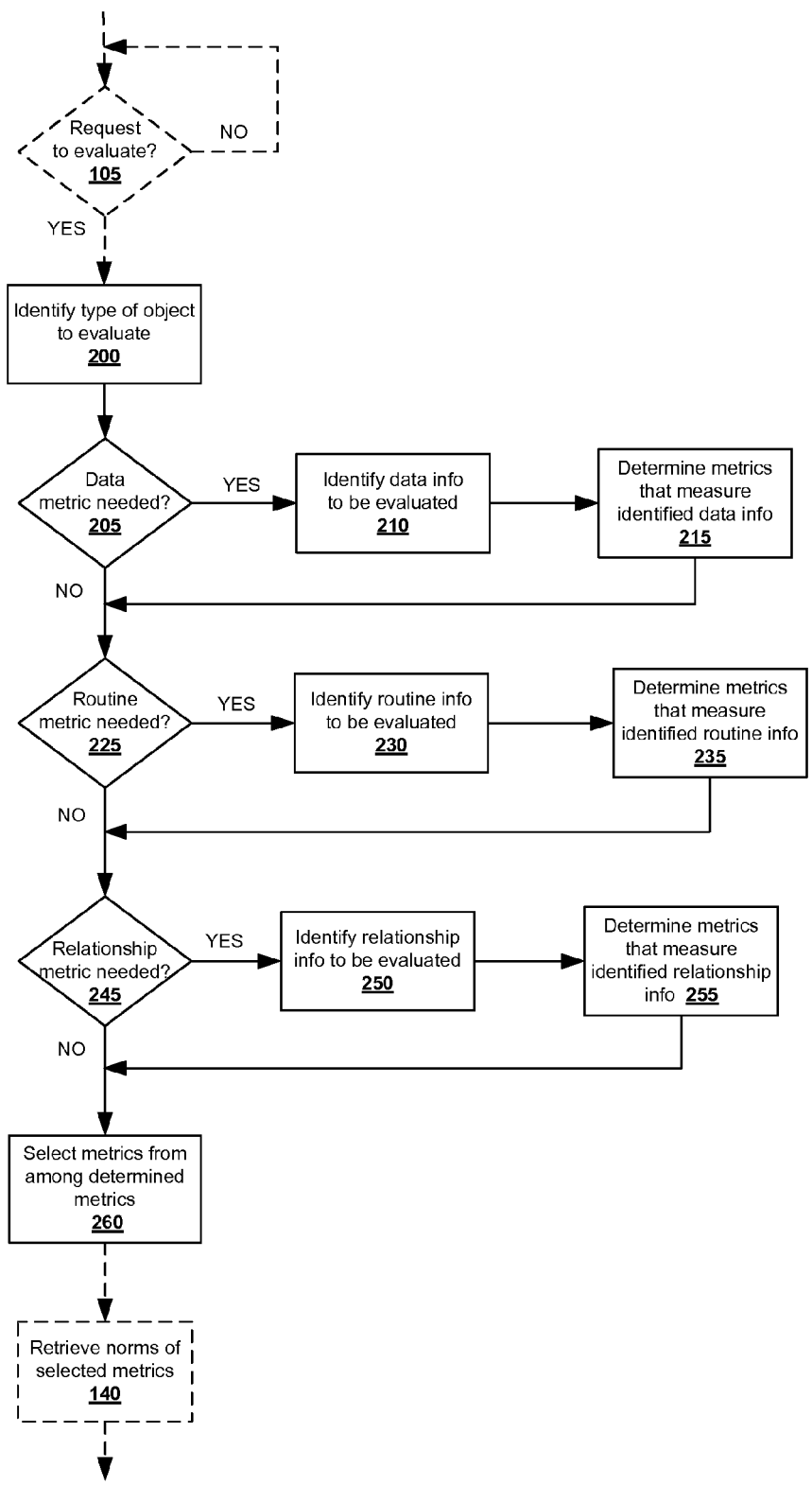
FIG. 2 is a flowchart of a method to select the metrics to be used to evaluate the acceptability of process objects in accordance with an embodiment of the present invention.

FIG. 2 is a flowchart of a method to select the metrics to be used to evaluate the acceptability of process objects in accordance with an embodiment of the present invention. As in FIG. 1, a processor may select (110) metrics for process objects to determine whether the process objects are acceptable for use in a computer system.

To do so, the processor may identify (200) the type of the process object to be evaluated, e.g., whether it monitors, calculates, etc., in the system. Based on this determination, the processor may then determine the type of metrics to be used to measure information and/or properties of the process objects. As stated previously, the metrics measure the object components and/or relationships. Accordingly, the processor may determine whether a metric is needed to measure the data and/or routine components and/or the structures that define the object relationships.

If a metric to evaluate data is needed (205), the processor may identify (210) the information and/or properties about the data that are needed to evaluate whether a process object is acceptable for use. Based on the identified information and/or properties, the processor may determine (215) which of the metrics measure the identified data information and/or properties. If a data metric is not needed (205), the processor may proceed to determine whether routine and/or relationship metrics are needed.

Next, if a metric to evaluate a routine is needed (225), the processor may identify (230) the information and/or properties about the routines that are needed to evaluate whether a process object is acceptable for use. Based on the identified information and/or properties, the processor may determine (235) which of the metrics measure the identified routine information and/or properties. If a routine metric is not needed (225), the processor may proceed to determine whether relationship metrics are needed.

Then, if a metric to evaluate a relationship is needed (245), the processor may identify (250) the information and/or properties about the relationships that are needed to evaluate whether a process object is acceptable for use. Based on the identified information and/or properties, the processor may determine (255) which of the metrics measure the identified relationship information and/or properties.

The processor may use any appropriate way to identify the information and/or properties needed and to determine the metrics to be used. For example, the processor may consult a look-up table, in which metrics are categorized based on the type of process object and/or identified properties of the process objects. Alternatively, the processor may accept user inputs selecting the metrics to be used.

After determining the needed metrics, the processor may select (260) the metrics to be used from among those determined to be needed. In most cases, the selected metrics may be those that are commonly determined. For example, if metric A is determined to be a needed data, routine, and structure metric, then metric A will be selected since it advantageously evaluates all aspects of the process objects. In some cases, the selected metrics may be those having higher selectivity values, i.e., those that have been determined to be most useful in determining acceptability. Any other appropriate selection criteria may be used.

As in FIG. 1, after the metrics are selected (110), the processor may retrieve (140) the norms of the selected metrics and then proceed with determining whether the process objects are acceptable for use in a computer system.

Figure 3:
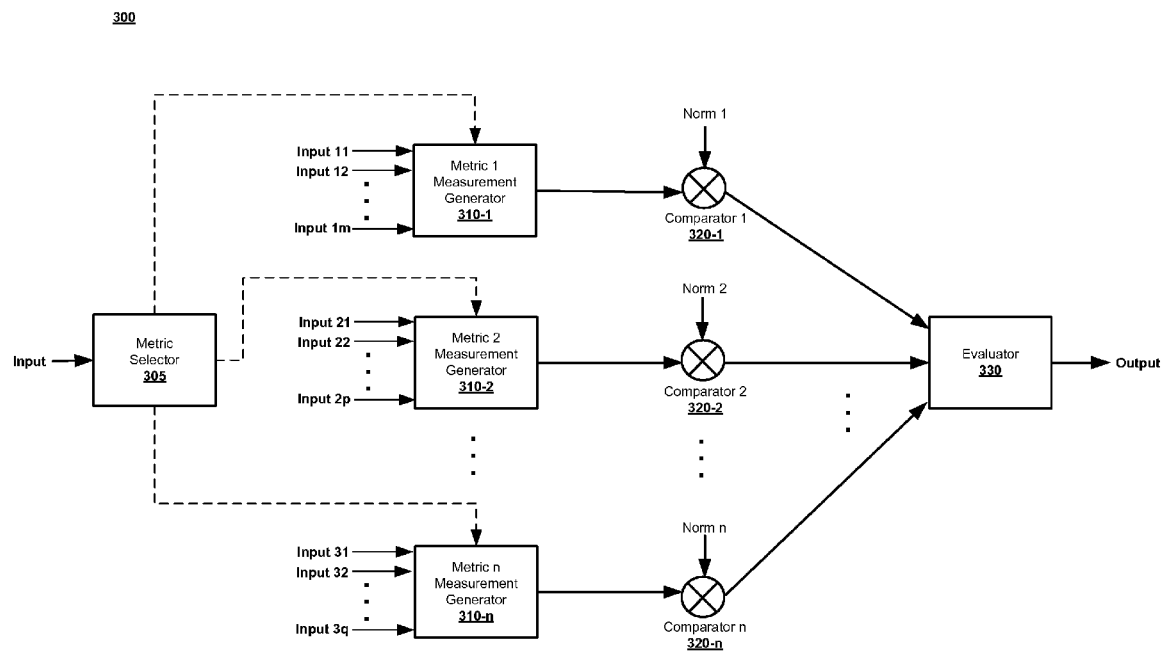
FIG. 3 is a block diagram of an apparatus to evaluate the acceptability of process objects in accordance with an embodiment of the present invention.

FIG. 3 is a block diagram of an apparatus to evaluate the acceptability for use of process objects in accordance with an embodiment of the present invention. An apparatus 300 may include a metric selector 305, metric measurement generators 310-1 . . . 310-n, comparators 320-1 . . . 320-n, and an evaluator 330. The metric selector 305 may receive input from a user or another processor and send an output to the metric measurement generators 310. The metric measurement generators 310 may receive the selector output and other process object information as input and send outputs to the comparators 320. The comparators 320 may receive the metric measurement generator outputs and corresponding metric norms as input and send outputs to the evaluator 330. The evaluator 330 may receive the comparator outputs as input and send an output to the user.

Optionally, the apparatus 300 may include an object generator (not shown). The object generator may receive the evaluator output and corrective information from the user as input and send an output to the selected metric measurement generators 310 as process object information.

The metric selector 305 may select one or more metric to be measured for a process object. To do so, the metric selector 305 may receive input from a user or another processor that includes information about the type of process object to be evaluated. The metric selector 305 may identify information and/or properties about the data, routines, or defined relationships of the process object to be used to evaluate the process object. The metric selector 305 may then determine which metrics should be used to best indicate the process object's acceptability, based on the identified information and/or properties. Alternatively, the metric selector 305 may receive the selections from the user. The metric selector 305 may then send command signals to the metric measurement generators 310 to command the generators 310 corresponding to the selected metrics to generate a measurement. In one embodiment, the metric selector 305 may send the command signals to all the generators 310, where the command signal to the selected generators 310 is to generate their respective measurements and the command signal to the non-selected generators 310 is to remain idle and/or discard any output. In an alternate embodiment, the metric selector 305 may send the command signals only to the selected generators 310 to generate their respective measurements.

The metric measurement generators 310 may generate the measurements of metrics. To do so, the metric measurement generators 310 may receive command signals from the metric selector 305 to generate measurements. The generators 310 may also receive process object information and/or property data as inputs from which the measurements are generated. The inputs may be related to the information and/or properties identified by the metric selector 305. The generators 310 may then generate the measurements as outputs and send the measurements to the comparators 320. The outputs may be numbers, characters, logic, etc., and any combination thereof. For example, the metric 1 measurement generator 310-1 may receive inputs 11, 12, . . . 1m, which may be information and/or property data about the process objects' data, routines, and/or defined relationships that are relevant to the metric of the generator 310-1. If the metric is the object complexity, the input information to the generator 310-1 may be the number of routines in the process object and the number of relationships within the routines, which the metric generator then use to determine whether the object complexity is low, medium, or high. For example, if the number of routines is 5 or less and the number or relationships is 5 or less, the metric generator may determine the complexity to be low and generate a complexity level value of 3 to output to the respective comparator 320-1. For those generators 310 that are not selected, their outputs may be zero, null, or any equivalent output to indicate that no measurement was generated.

The comparators 320 may compare the generated measurements with the corresponding metric norms. To do so, the comparators 320 may receive the outputs from the respective measurement generators 310 as inputs. The comparators 320 may also receive the corresponding metric norms as inputs. The comparators 320 may then output the difference between the measurements and their corresponding metric norms to the evaluator 330. The outputs may be numbers, characters, symbols, logic, etc., and any combination thereof. Continuing with the example from above, metric 1 measurement generator 310-1 may output the object complexity level value of 3. The corresponding metric norm may be 4, which represents an acceptable level of complexity. The comparator 310-1 may then output −1, which is the difference between the measurement 3 and the corresponding norm 4 for this metric. For those comparators 320 that are not selected, their outputs may be zero, null, or any equivalent output to indicate that no comparison was done.

The evaluator 330 may evaluate the acceptability of the object based on the comparator results. To do so, the evaluator 330 may receive the outputs from the comparators 320 as inputs. The evaluator 330 may then determine whether the comparator results indicate that the process object is acceptable for use, as described above in FIG. 1. The evaluator 330 may output an "unacceptable" indication in an error message if the process object is not acceptable. Alternatively, the evaluator 330 may output an "acceptable" indication if the process object is acceptable. Continuing with the example from above, the comparator 320-1 may output a difference of −1. The evaluator 330 may deem an object as acceptable if the comparator output is less than or equal to zero, which means that the complexity is at or lower than the norm. Accordingly, since the comparator result is −1, the evaluator 330 may deem this process object to be acceptable for use in applications.

In this example, if the object complexity level value had been 8, the comparator result would have been +4. Accordingly, the evaluator 330 would have deemed this process object to be unacceptable and notified the user. The user could then use the object generator to input revisions to the routines and/or relationships of the objects and then generate a revised object, for which the evaluation could be redone.

It is to be understood that the apparatus is not limited to those elements and/or the configuration shown, but may include any elements and any configuration capable of evaluating process objects to determine acceptability of use in accordance with an embodiment of the present invention.

FIG. 4 is a chart of example metrics that may be used to evaluate the acceptability of process objects in accordance with an embodiment of the present invention. The example metrics include process object design quality, critical constructs, design process efficiency, graph theoretical analysis, and architectural fit. Each of these metrics takes into account both components and their relationships when determining measurements, thereby making them well-suited for the process objects in accordance with embodiments of the present invention.

In this example, the process object design quality metric measures the quality of the design of process objects. Sub-metrics may include functional correctness, i.e., whether the object functions as designed; comprehensibility, i.e., whether the design is understandable by designers and design reviewers; flexibility, i.e., whether the design can be modified easily; structural complexity, i.e., how complex the object components and relationships are; model correctness, i.e., whether the designed object is complete; implementation complexity, i.e., how easy it is to implement the design; separation of concerns, i.e., how well the design separates business processes among objects; suitability for user interface consumer, i.e., how consumer-friendly the designed object is; and business readiness, i.e., whether the design is ready to implement and deploy. The sub-metrics may be considered together and equally weighted or weighted by importance to determine an overall measurement for the design quality metric. Alternatively, the sub-metrics may be considered as separate metrics.

The critical constructs metric measures how many critical components and relationships the object has. This may affect performance speed and efficiency.

The design process efficiency metric measures whether the design process itself was efficient in time, people, and resources.

The graph theoretical analysis metric measures whether the design of new or revised process objects includes anomalies in objects' data, routines, and/or relationships. The metric uses graphical analysis to measure anomalies.

The architectural fit metric measures how well the design matches the actual business process.

FIG. 4 includes examples of some inputs to the respective metrics, input sources, metric measurements generated from the respective inputs, and the corresponding norms to be compared to the measurements.

It is to be understood that the chart in FIG. 4 is for example purposes and not intended to be comprehensive, as many other metrics, metric inputs, input sources, measurements, and/or norms may be used to determine the acceptability of process objects.

Figure 5:
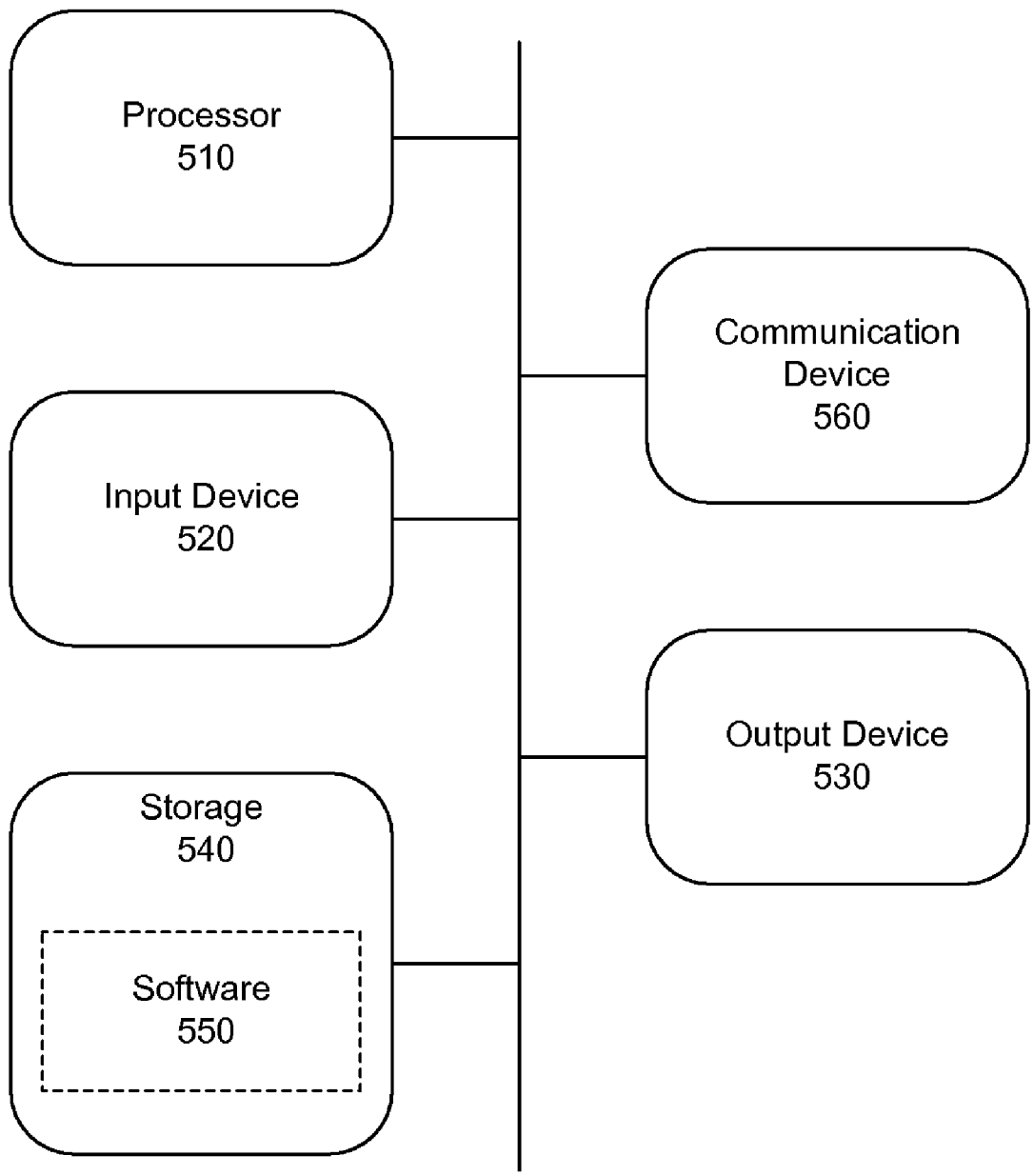
FIG. 5 is a block diagram that depicts a computing device for implementing a method in accordance with an embodiment of the present invention.

FIG. 5 illustrates the components of a basic computing device in accordance with an embodiment of the present invention. The computing device may be a personal computer, workstation, handheld personal digital assistant ("PDA"), or any other type of microprocessor-based device. The computing device may include one or more of processor 510, input device 520, output device 530, storage 540, and communication device 560.

Input device 520 may include a keyboard, mouse, pen-operated touch screen or monitor, voice-recognition device, or any other device that provides input. Output device 530 may include a monitor, printer, disk drive, speakers, or any other device that provides output.

Storage 540 may include volatile and nonvolatile data storage, including one or more electrical, magnetic or optical memories such as a RAM, cache, hard drive, CD-ROM drive, tape drive or removable storage disk. Communication device 560 may include a modem, network interface card, or any other device capable of transmitting and receiving signals over a network. The components of the computing device may be connected via an electrical bus or wirelessly.

Software 550, which may be stored in storage 540 and executed by processor 510, may include, for example, the application programming that embodies the functionality of the present invention.

The network connecting the computer components may include any type of interconnected communication system, which may implement any communications protocol, which may be secured by any security protocol. The corresponding network links may include telephone lines, DSL, cable networks, T1 or T3 lines, wireless network connections, or any other arrangement that implements the transmission and reception of network signals.

The computing device may implement any operating system, such as Windows or UNIX. Software 550 may be written in any programming language, such as ABAP, C, C++, Java or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method for evaluating process objects, comprising:

receiving, by a processor, a request to evaluate a process object, wherein the process object describes a structure and behavior of a business process;

identifying, by the processor, a type of the process object, and when data of the process object is to be evaluated, determining which of a plurality of metrics evaluates data, when a routine of the process object is to be evaluated, determining which of the plurality of metrics evaluates routines, when a relationship of the process object is to be evaluated, determining which of the plurality of metrics evaluates relationships;

selecting, by the processor, at least one metric from among the determined metrics to evaluate the process object;

based on each selected metric, identifying, by the processor, characteristic information required by each selected metric;

extracting, by the processor, from the process object the identified characteristic information for each selected metric, wherein each metric extracts different characteristic information;

performing, by the processor, a metric operation on the extracted characteristic information for each selected metric to generate measurements, wherein each metric has a different metric operation, has a different metric input, and measures a different characteristic of the process object;

evaluating, by the processor, measurements of each selected metric; and based on the evaluation, accepting, by the processor, the process object for integration into an application.

2. The method of claim 1, further comprising:
when the data of the process object is to be evaluated,
identifying, by the processor, information about the data, and
determining, by the processor, the metrics to evaluate the data based on the identification.

3. The method of claim 1, further comprising:
when the routine of the process object is to be evaluated,
identifying, by the processor, information about the routine, and
determining, by the processor, the metrics to evaluate the routine based on the identification.

4. The method of claim 1, further comprising:
when the relationship of the process object is to be evaluated,
identifying, by the processor, information about the relationship, and
determining, by the processor, the metrics to evaluate the relationship based on the identification.

5. The method of claim 1, wherein the selecting comprises:
selecting, by the processor, the metric that is commonly determined in all of the determinations.

6. The method of claim 1, wherein the selecting comprises:
selecting, by the processor, the metric that has the highest selectivity value of the determined metrics.

7. The method of claim 1, wherein the evaluating comprises:
comparing, by the processor, measurements of the selected metric to corresponding norms.

8. The method of claim 7, wherein the comparing comprises:
determining, by the processor, measurements of the selected metric for the process object,
retrieving, by the processor, norms of the selected metric from memory, and
comparing, by the processor, the determined measurements to the retrieved norms.

9. The method of claim 7, wherein the accepting comprises:
accepting, by the processor, the process object if the differences between the measurements and the corresponding norms are approximate to predetermined values, within predetermined ranges, or less than or greater than predetermined limits,
otherwise, not accepting, by the processor, the process object.

10. The method of claim 7, wherein the evaluating comprises:
determining, by the processor, whether at least a predetermined number of the measurements are comparable to the corresponding norms.

11. The method of claim 1, wherein the accepting comprises:
upon not accepting the process object, sending, by the processor, a message to a user regarding unacceptability of the process object,
awaiting receipt of a revised process object from the user that corrects the unacceptability, and
upon receipt of the revised process object, repeating, by the processor, the evaluating until the process object is acceptable.

12. The method of claim 1, wherein the plurality of metrics measure at least one of design quality, object criticalities, design process efficiency, object anomalies, or architectural fit.

13. A system for evaluating process objects, comprising:
a memory to store a plurality of metrics, a plurality of corresponding norms, and at least one process object; and
a processor in communication with the memory, the processor to:
responsive to a request, determine at least one of the metrics that evaluates process object data, routines, and relationships by:
when data of the process object is to be evaluated, determining which of the plurality of metrics evaluates data,
when a routine of the process object is to be evaluated, determining which of the plurality of metrics evaluates routines, and
when a relationship of the process object is to be evaluated, determining which of the plurality of metrics evaluate the process object,
select at least one determined metric to evaluate the process object,
based on each selected metric, identify characteristic information required by each selected metric,
extract from the process object the identified characteristic information for each selected metric, wherein each metric extracts different characteristic information,
perform a metric operation on the extracted characteristic information for each selected metric, wherein each metric has a different metric operation, has a different metric input, and measures a different characteristic of the process object, and
evaluate acceptability of the process object based on measurements of the selected metric.

14. The system of claim 13, wherein performing the metric operation the processor is to:
calculate measurements of the determined metric for the process object based on information about the data, the routines, and the relationships of the process object.

15. The system of claim 14, wherein the processor is to:
compare the calculated measurements for the process object with the corresponding norms of the determined metric in order to identify the difference therebetween.

16. The system of claim 15, wherein the processor is to:
evaluate whether the process object is acceptable if the differences between the calculated measurements for the process object and the corresponding norms are within predetermined limits.

17. The system of claim 13, wherein the processor is to:
display the result of the evaluation to a user.

18. A processor to evaluate the acceptability of process objects, comprising:
a metric selector to
identify at least one metric to evaluate process object data,
identify at least one metric to evaluate process object routines,
identify at least one metric to evaluate process object associations, and
select at least one metric from among the identified metrics to evaluate a process object comprising data, routines, and associations;
based on each selected metric, identify characteristic information required by each selected metric;

extract from the process object the identified characteristic information for each selected metric, wherein each metric extracts different characteristic information;

at least one metric measurement generator to generate a measurement of each selected metric based on a metric operation, wherein each metric has a different metric operation, has a different metric input, and measures a different characteristic of the process object;

at least one comparator to compare the generated measurement with a corresponding norm of the selected metric; and an evaluator to evaluate how acceptable the process objects are for integration into an application, based on the comparator output.

19. The processor of claim 18, further comprising:

a display to present the evaluator output to a user.

20. The processor of claim 18, further comprising:

an object generator to generate a new process object to replace an unacceptable process object, in response to input information that corrects unacceptable data, routines, or associations.

* * * * *